United States Patent [19]

Prosser

[11] 4,160,736

[45] Jul. 10, 1979

[54] ROTATING TRICKLING FILTER

[75] Inventor: David G. Prosser, Mequon, Wis.

[73] Assignee: Autotrol Corporation, Milwaukee, Wis.

[21] Appl. No.: 840,532

[22] Filed: Oct. 11, 1977

[51] Int. Cl.² ............................................. C02C 1/04
[52] U.S. Cl. .............................. 210/150; 210/198 R; 210/17; 261/92
[58] Field of Search ............. 210/150, 151, 17, 198 R, 210/63, 15, 221; 261/92, 93

[56] References Cited

U.S. PATENT DOCUMENTS

| | | | |
|---|---|---|---|
| 3,325,154 | 6/1967 | McDonnell | 261/92 |
| 3,779,911 | 12/1973 | Freudenthal et al. | 210/151 |
| 3,827,559 | 8/1974 | Gass et al. | 261/92 |
| 3,886,074 | 5/1975 | Prosser | 261/92 |
| 3,956,127 | 5/1976 | Holmberg | 261/92 |

*Primary Examiner*—Benoît Castel

*Attorney, Agent, or Firm*—Quarles & Brady

[57] ABSTRACT

There is disclosed a rotating trickling filter formed from an elongated, hollow, circular cylindrical shell in which fixed film contactor media is mounted. Wastewater is introduced through an inlet at one end of the shell and exits through an outlet at the opposite end. The volume of wastewater within the shell is maintained as a small fraction of the total volume within the shell and collects as a shallow pool of wastewater at the bottom of the shell. Longitudinal channels sweep through the pool of wastewater as the shell is rotated to raise wastewater and discharge it over the media, which also rotates with the shell. In one embodiment the shell is cradled on belts, one of which is driven to rotate the shell. In another embodiment, the shell is mounted within a holding tank of wastewater and is driven by the release of gas under pressure from a conduit disposed beneath the shell, with the gas being trapped in cups arranged about the perimeter of the shell.

9 Claims, 7 Drawing Figures

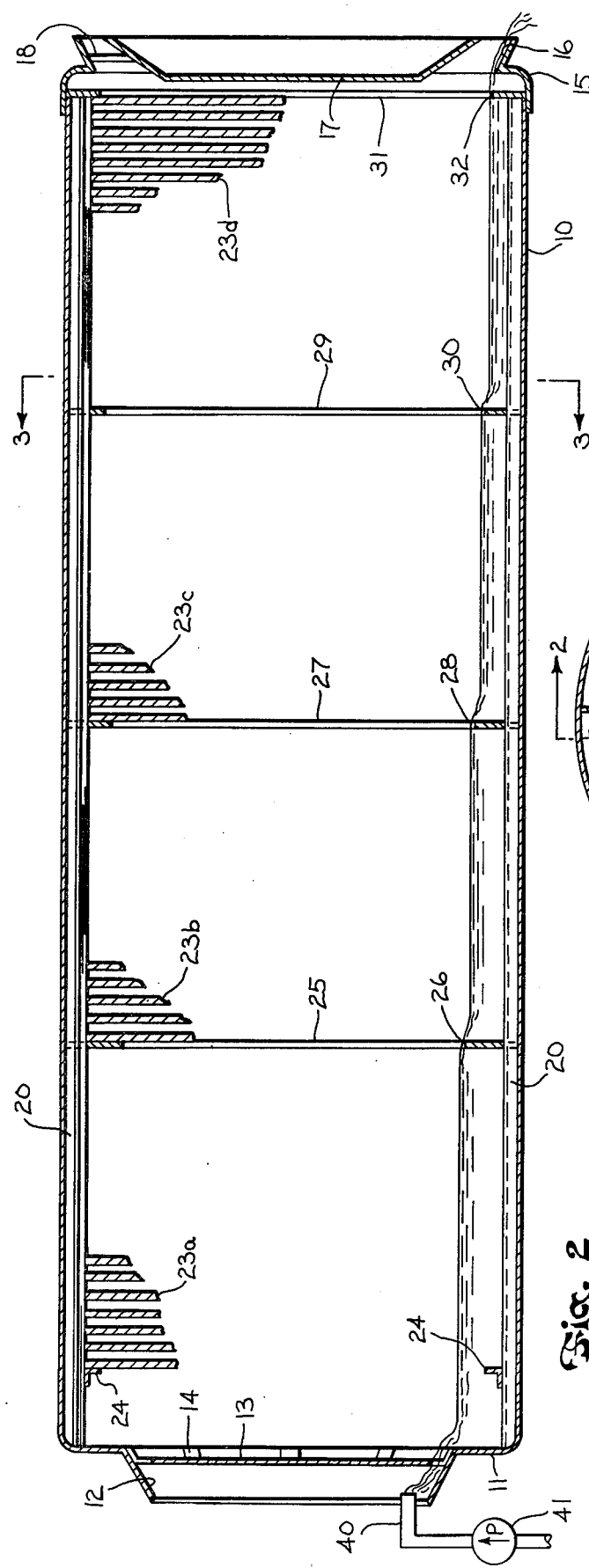
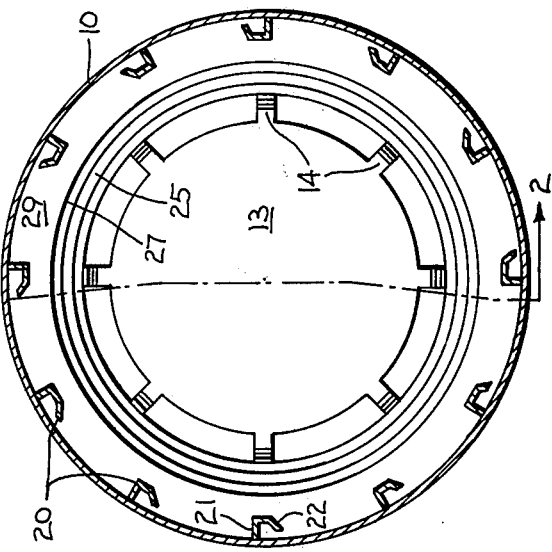
Fig. 2
Fig. 3

ROTATING TRICKLING FILTER

BACKGROUND OF THE INVENTION

This invention relates to the biological treatment of wastewater, and more particularly to the treatment of wastewater by use of a rotating trickling filter.

Biological wastewater treatment is commonly employed as a secondary treatment following a primary treatment which usually involves simple course screening and plain sedimentation to remove the settleable solids from the wastewater. In biological treatment, growths of biological slimes or flocks are employed which utilize the pollutants in the presettled wastewater for their natural growth processes. Biological secondary wastewater treatment commonly utilizes aerobic processes for organic removal. Successful biological wastewater treatment processes provide means for bringing wastewater into contact with the biological slimes or flocks so as to supply nutrients and to also bring dissolved oxygen, usually supplied by air, into contact with the slimes or flocks adequate for their respiration.

Presently used biological treatment processes include the activated sludge process, trickling filtration, and rotating biological contactors. In the activated sludge process, including its variations such as modified aeration and step aeration, wastewater is aerated in the presence of controlled amounts of free-floating biological flocks. The air used to agitate the wastewater and flock mixture to bring about contact between the wastewater and the biological flocks also supplies the oxygen for respiration.

In the trickling filtration process, presettled wastewater is passed over slimes grown on and attached to stationary surfaces. In their basic forms the surfaces are usually rock beds but more recently formed plastic media has been used. Examples of such trickling filter media are shown in U.S. Pat. No. 3,403,095 issued Sept. 24, 1968 to Chipperfield et al and U.S. Pat. No. 3,260,511 issued July 12, 1966 to Greer.

The rotating biological contactor process is the most recently commercialized process using biological treatment. It employs rotating surfaces which are partially submerged in wastewater held in a tank and rotated to expose the surfaces consecutively to wastewater and the overlying atmosphere. The rotating surfaces can be simple spaced discs along a shaft (see British Pat. No. 935,162 to Hartmann, published Aug. 28, 1963; or U.S. Pat. No. 3,335,081 issued to El-Naggar on Aug. 8, 1967) or may take a more complex form of generally cylindrical contactor media exhibiting a greater surface area than is available by spaced discs (see U.S. Pat. No. 3,827,559 issued Aug. 6, 1974 to Gass et al). The rotating contactor is typically submerged in wastewater to about 40% of its diameter; that is, to near its axis of rotation.

Another form of rotating contactor uses a cylinder formed of screening and containing hollow plastic spheres (see Swedish Pat. No. 370,635, published Oct. 28, 1974). This latter arrangement discloses irrigation tubes mounted along the inner surface of the screen cylinder and which lift water and pour it over the plastic spheres as the drum rotates.

A hybrid process described by the inventor as a rotating activated sludge process is disclosed in Swedish Pat. No. 100,517, published Dec. 17, 1940. In that patent growth bodies such as pieces of wood or cork are tumbled within a drum into which wastewater and air are fed. In one version the growth bodies are mounted within a screen-like cylinder which in turn is mounted within an impervious cylindrical shell. Provision is made to rotate the outer shell and the cylinder separately, and lifting bodies are connected to the inner periphery of the drum in the space between the drum and the inner cylinders to carry water upwardly over the cylinder for dumping as the drum rotates.

By my invention I combine operating characteristics of both the trickling filter and rotating biological contactor to achieve what I call a rotating trickling filter. The filter material or media is packed within a hollow cylindrical shell and wastewater is introduced into one end of the shell, with the amount of wastewater controlled so that it occupies only a very small portion of the volume within the shell. The shell is rotated and the wastewater which naturally occupies the lower portion of the shell is washed over the media surfaces. The rotating trickling filter of my invention has the advantages inherent in stationary trickling filter processes and requires lower power to rotate the unit than would a rotating biological contactor assembly of comparable size because there is less hydraulic drag. There is a much lower stress on the media because the media can be supported and driven at its periphery rather than through a central shaft or tie rods which localize stress. Full contact of the wastewater within the shell with media surfaces is insured because of the low wastewater volume being treated at any particular time in the process. Rotation overcomes the plugging problems which are inherent in a stationary trickling filter.

SUMMARY OF THE INVENTION

In accordance with the invention, a wastewater treatment apparatus is provided which includes a hollow, imperforate cylindrical shell having a wastewater inlet, a fluid outlet, means for rotating the shell, and a biological contactor media mounted within said shell and adapted to rotate with said shell.

Further in accordance with the invention, the contactor media may have its radially outer surfaces spaced from the inner perimeter of the shell with the space occupied by lifting means adapted to fill with water as the lifting means rotates through the wastewater at the bottom of the shell and to carry that wastewater upwardly and pour the same over the contactor media as the apparatus continues to rotate.

The invention may further reside in disposing such apparatus within a holding tank for wastewater and rotating the apparatus by means of a plurality of cups disposed on the outer periphery of the shell which trap gas released from a discharge conduit disposed within the tank beneath the open cups.

The invention may also reside in the addition of means for introducing an oxygen enriched gas into the interior of said shell.

It is a principal object of this invention to provide an apparatus for the treatment of wastewater which exposes the wastewater to a large contactor surface area for the growth of a biological slime.

It is another object of the invention to provide such an apparatus in which a small amount of wastewater is introduced to a large contactor surface within a hollow imperforate shell.

It is another object of the invention to provide a rotating biological contactor which requires less energy for operation by reason of reduced hydraulic drag.

It is still another object of the invention to provide a rotating biological contactor in which the contactor media is subjected to only a low mechanical stress.

The foregoing and other objects and advantages of the invention will appear in the detailed description which follows. In the description reference is made to the accompanying drawings which illustrate preferred embodiments of the invention.

BRIEF DESCRIPTION OF THE DRAWINGS

FIG. 2 is a view in vertical section taken along the longitudinal axis of the rotating trickling filter of FIG. 1;

FIG. 3 is a view in vertical cross section taken in the plane of the line 3—3 of FIG. 2 and illustrating the shell with the contactor media removed;

DETAILED DESCRIPTION OF THE PREFERRED EMBODIMENTS

Figure 1:
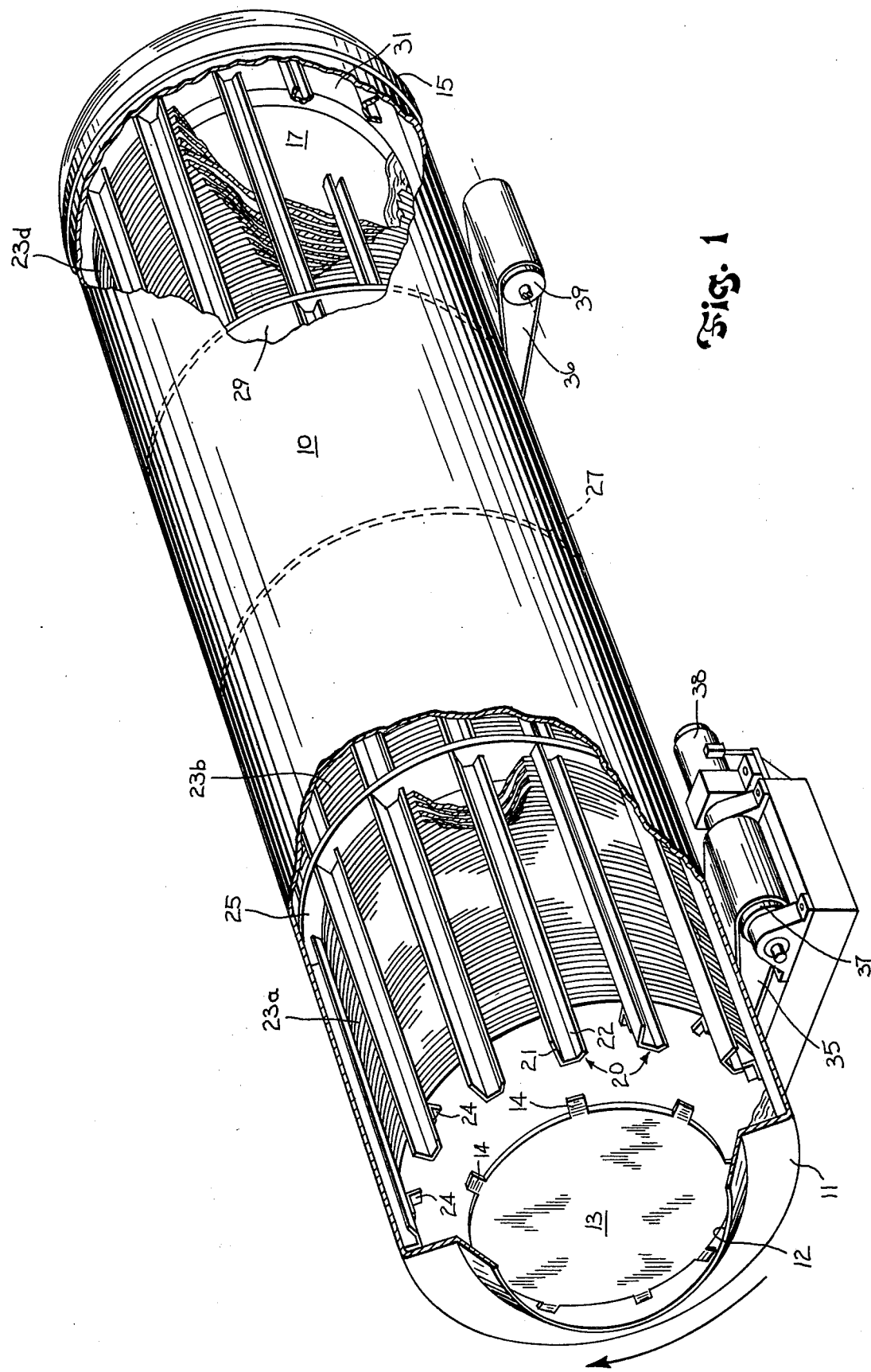
FIG. 1 is a view in perspective, with portions broken away for clarity, of a first embodiment of a rotating trickling filter in accordance with the present invention.
Figure 4:
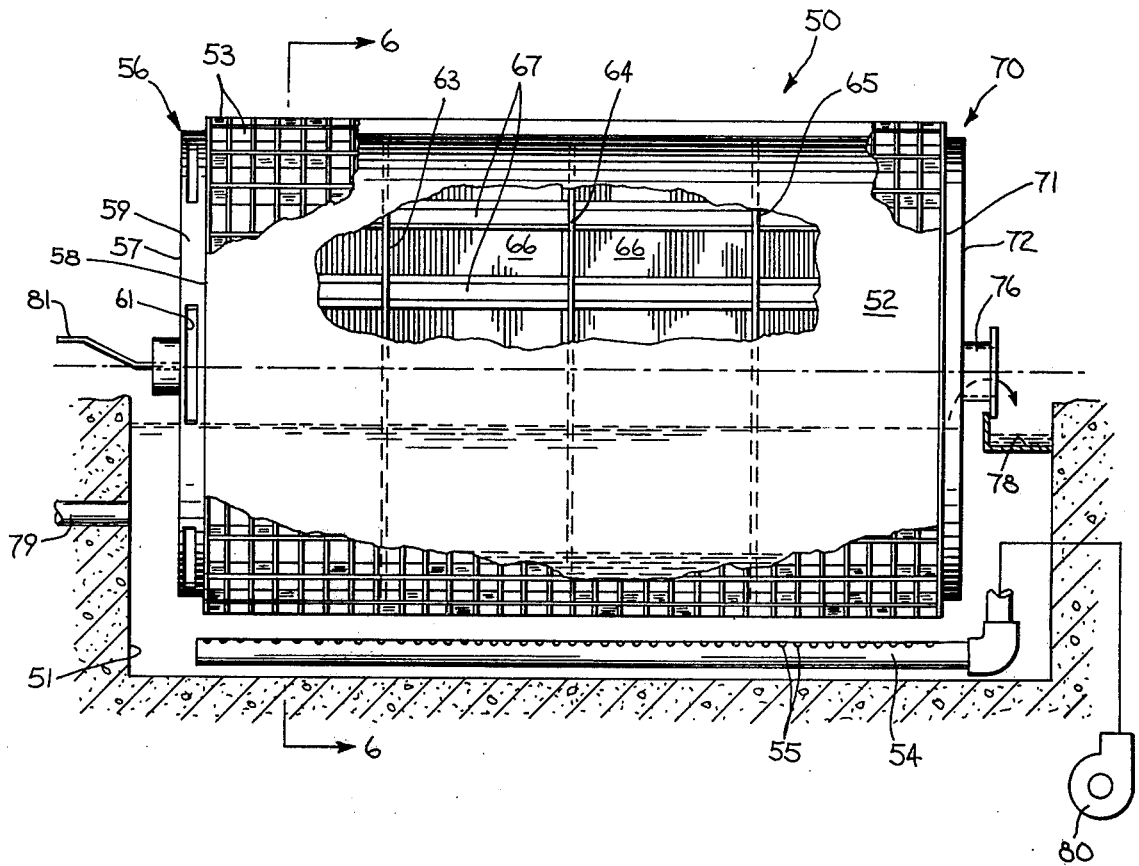
FIG. 4 is a view in side elevation, with portions broken away for clarity, of a second embodiment of the rotating trickling filter which is shown mounted in a tank.
Figure 5:
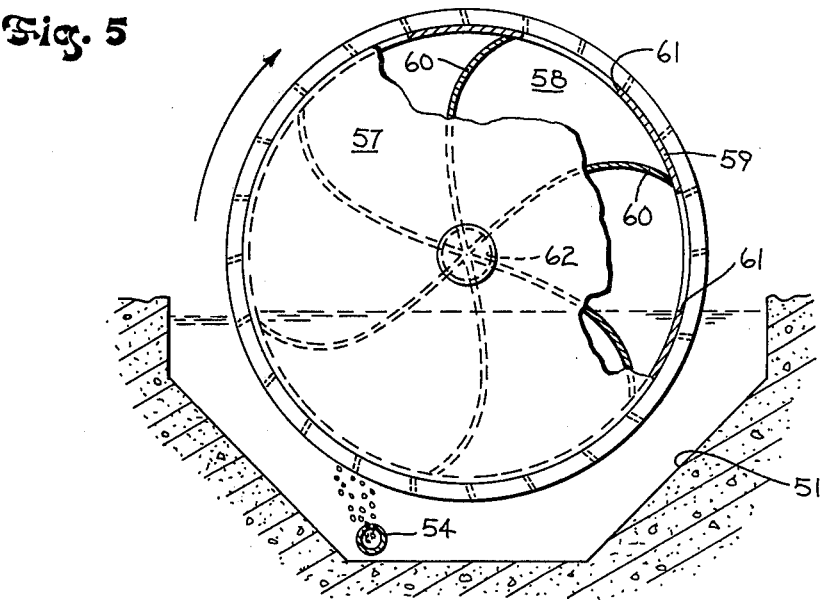
FIG. 5 is a view in elevation of the inlet end of the trickling filter of FIG. 4, again with portions broken away for purposes of illustration.

Referring to FIGS. 1–3, in the first embodiment of a rotating trickling filter in accordance with this invention an elongated, circular cylindrical, hollow, imperforate shell 10 is provided at one end with an inlet end portion 11 having a central opening and an inwardly inclined funnel-shaped lip 12. An inlet splash guard 13 is connected by spaced spokes 14 to the inside of the lip 12, and the spaces between adjacent spokes 14 provide wastewater inlets to the interior of the shell 10.

The opposite end of the shell 10 is provided with an outlet end cap 15 which also has a central opening and an outwardly inclined funnel-shaped lip 16. The central opening in the outlet end cap 15 is in part closed by an outlet splash guard 17 which is also held in place within the outlet lip 16 by radial spokes 18. The relatively large annular space defined about the outlet splash guard 17 and the opposing inner surface of the outlet lip 16 provides a fluid outlet for the shell 10 and allows for the escape of products of respiration, such as $CO_2$.

A plurality of channel-like troughs 20 extend longitudinally along the inner surface of the shell 10 at regularly spaced peripheral intervals. The troughs 20 each include a long leg 21 which may be attached to the inner surface of the shell 10. The opposite extending leg 22 of each trough 20 is spaced from the inner surface of the shell 10 so that water may enter and leave the troughs 20 for the purpose to be described hereafter.

The interior space within the shell 10 and between the bottoms of the troughs 20 is filled with contactor media designated generally by the numeral 23. The media may take many forms but is characterized by fixed surfaces arranged within the interior of the shell 10 and mounted to rotate with the shell 10 as the shell is rotated. The surfaces are arranged to be available for continuous exposure to the atmosphere within the shell 10 and also to wastewater within the shell 10. In its simplest form, the contactor media 23 may be a series of spaced flat discs as illustrated in FIG. 1. Alternatively, the contactor media can be built up from formed sheets, or from formed and flat sheets, in an array of surfaces similar to that disclosed and described in U.S. Pat. No. 3,827,559, issued Aug. 6, 1974 and assigned to the assignee of this invention. The media of such U.S. patent is characterized by having a plurality of radial passages opening to the perimeter and a plurality of generally concentric passages open at each end to a radial passage.

In the embodiment of FIG. 1, the media 23 is divided longitudinally of the shell 10 into several packs or sections. The packs or sections are divided by internal bulkheads which also function as weirs. Specifically, a first media pack 23a is disposed between media stop angles 24 and a first interior bulkhead 25. The bulkhead 25 has a large central opening, the inner edge 26 of which defines a weir for controlling the level of wastewater which will pass from the first media section 23a to a second media section 23b. The second and third media sections 23b and c, respectively, are divided by a second bulkhead 27 having a weir edge 28 which is at a lower level than that of the preceding weir edge 26 and the third and fourth media sections 23c and 23d, respectively, are interrupted by the third interior bulkhead 29 having a still lower weir edge 30. Finally, the output of water over the outlet lip 16 is controlled by a media retainer disc 31 adjacent the end cap 15 and having a central opening whose edge 32 defines a weir at a still lower relative elevation.

The shell 10 is rotated by a driven belt 35 which also supports the shell 10 adjacent its inlet end. An idler belt 36 supports the shell adjacent the outlet end. The shell 10 is cradled on the belts 35 and 36 which are each mounted at their end points on rollers. That is, the driven belt 35 is supported between a drive roller 37 connected to the output shaft of a motor-reducer 38 and an idler roller (not shown). The idler belt 36 in turn is disposed about two spaced idler rollers 39, only one of which is shown in FIG. 1. The shell 10 may be rotated by any number of alternative mechanisms such as a drive pinion meshing with a bull gear disposed about the outer periphery of the shell 10, or by a chain drive connected to a sprocket surrounding the shell 10.

In operation, a limited quantity of wastewater is continuously introduced into the inlet of the shell 10 by means of feed pipe 40 leading from a wastewater pump 41. The interior volume of the shell 10 between the inlet end portion 11 and the media stop 24 is unfilled with contactor media and will collect a pool of the water at the low point of the shell. This unoccupied volume functions as a wet well. The shell 10 is continuously rotated, and water in the bottom of the shell will be scooped by the troughs 20 and carried upwardly past center and will be discharged after each trough 20 begins its descent. The discharged water will flow, or trickle, over the contactor media 23 which is also rotating with the shell 10. The contactor media 23 will also pick up some wastewater as it sweeps through the shallow pool of wastewater in the bottom of the shell 10. The continued lifting and discharge of the wastewater over the rotating contactor media 23 distributes all wastewater uniformly and insures intimate contact with the biological slime that will grow on the surfaces of the media 23. Since most of the surface of the media 23 is not submerged in wastewater, extensive exposure of all media surfaces to the atmosphere, typically air, within the interior of the shell 10 will occur so that the biological slimes will have sufficient oxygen available for respiration. The biological slimes will remove the pollutants from the wastewater and will slough off when they become too thick or die. The rotational motion plus a constant washing of the surface by wastewater which is discharged from the troughs will assist the sloughing and washing away of sloughed slimes.

The troughs 20 are so shaped as to discharge their contents at a point near the apex of the shell 10 where it can assist in the rotation of the shell 10. That is, the trajectory of the discharged wastewater is such that the weight of the film of wastewater discharged over the surfaces of the media 23 will be a moment force additive to the external driving force. This will reduce the energy required to rotate the shell 10.

Because the amount of water contained within the shell represents only a very small fraction of the total volume within the shell and will not rise to a significant level, there is very little hydraulic drag of the water over the surfaces of the contactor media as the entire apparatus is rotated. Furthermore, since the rotational forces are imparted to the media from the perimeter rather than from a central shaft as is often done in rotating contactor technology, the mechanical stress on the contactor media will be low and the media can therefore be formed of material which cannot take large stresses.

As wastewater moves through the shell 10 from the inlet towards the outlet it will be successively purified. The interior bulkheads 25, 27 and 29 divide the contactor media 23 into several functioning stages. In the initial stages the biological slime which grows will be predominantly that which oxidizes carbonaceous matter in the wastewater. In the later stages a biological growth will predominate which will oxidize nitrogenous material. The later stage slime which oxidizes the nitrogenous material will not be as thick on the surfaces of the media 23. The weir edges 26, 28 and 30 control the level of wastewater admitted into each stage of the treatment so that the desirable staging effect can be realized. The sloughed off slime will be carried with the water to the outlet where it can be removed in a subsequent clarifier.

The apparatus of the first embodiment can also be operated as a single stage treatment, rather than in stages. In that event, the interior weirs 26, 28 and 30 would not be used and a homogeneous mixture of wastewater would be applied to the media surfaces.

The depth of wastewater in the bottom of the shell 10 represents only a small fraction of the interior diameter of the shell 10. The wastewater depth need not be greater than is necessary to fill each trough 20 during each revolution of the shell 10 plus a small hydraulic head needed to insure the flow of wastewater from the inlet end to the outlet end.

The shell 10 being impervious provides a natural cover for the contactor media to guard against the deleterious effects of rain, sun, or cold temperature. Thus, a separate cover for the apparatus is not needed to protect against such environmental factors.

The shell may be made from metal or from synthetic material such as glass reinforced resins. The interior bulkheads and troughs may be made from the same materials and the contactor media is commonly made from expanded polystyrene, in the case of flat discs, or flat and formed polyethylene sheets, in the case of the complex media shapes.

In the second embodiment illustrated in FIGS. 4–7, the rotating trickling filter unit 50 is mounted in a tank 51 which will function as a holding tank for wastewater. The rotating trickling filter 50 is partially submerged to about 40% of its diameter in the wastewater in the holding tank 51. The rotating trickling filter 50 again is formed from a circular cylindrical, impervious, hollow shell 52. The outer periphery of the shell 52 is covered with an array of shallow cups or pockets 53 which open generally in a direction opposite to the direction of rotation which will be imparted to the rotating filter 50. A gas discharge conduit 54 is disposed in the wastewater held in the tank 51 beneath and to one side of the center of the rotating trickling filter 50. The discharge conduit 54 has a plurality of orifices 55 through which air or other oxygen containing gas under pressure is discharged. As the discharged gas rises through the wastewater it will become trapped in the cups 53 and the buoyant force of the trapped air or other gas will cause the filter 50 to rotate.

The filter 50 has an inlet assembly 56 which is formed from spaced walls 57 and 58 which are joined at their peripheries by a ring 59. The innermost wall 58 functions as one end wall for the shell 52. A plurality of curved partitions or vanes 60 extend between the walls 57 and 58 and from the ring 59 to the center axis of the filter 50 where the vanes 60 meet. An inlet opening 61 is provided in the ring 59 at each pocket formed by adjacent vanes 60. As will be seen in FIG. 5, as the filter is rotated, water will enter a pocket between adjacent vanes 60 and will be carried towards the center of the inlet assembly 56 where it will enter the interior of the shell 52 through a central opening 62 in the innermost wall 58. In this manner, a constant supply of wastewater from the holding tank 51 will be supplied to the inlet 62 of the trickling filter unit 50.

As in the first embodiment, the trickling filter unit 50 includes interior bulkheads 63, 64 and 65 which divide the interior of the shell 52 into a series of stages each of which is filled by contactor media 66. In the embodiment shown in FIGS. 4–7, the contactor media is of the general form illustrated and described in the aforementioned U.S. Pat. No. 3,827,559. Furthermore, a plurality of channel-like troughs 67 are again disposed between the interior surface of the shell 52 and the outer perimeter of the contactor media 66.

Treated water will leave the rotating filter 50 through an outlet assembly 70. The outlet assembly 70 is also formed with inner and outer walls 71 and 72, respectively, joined by a continuous ring 73. The innermost wall 71 functions as the second end wall for the shell 52. A plurality of curved partitions or vanes 74 lead from the central axis of the outlet assembly to the ring 73. The inner wall 71 has an opening 75 in each space defined between adjacent vanes 74 and the openings 75 are disposed adjacent the ring 73. Treated water within the shell 52 at the outlet end can flow through the openings 75 into a respective pocket formed between adjacent vanes 74 and will flow along a vane towards the central axis where it will be discharged out of a discharge pipe 76 aligned with an opening 77 in the outer wall 72. Effluent from the discharge pipe 76 can be collected in an effluent trough 78 and carried away for additional treatment such as clarification, or for disposal. The holding tank 51 is fed by an inlet pipe 79 and the discharge conduit 54 may be supplied with air by a blower 80.

Figure 6:
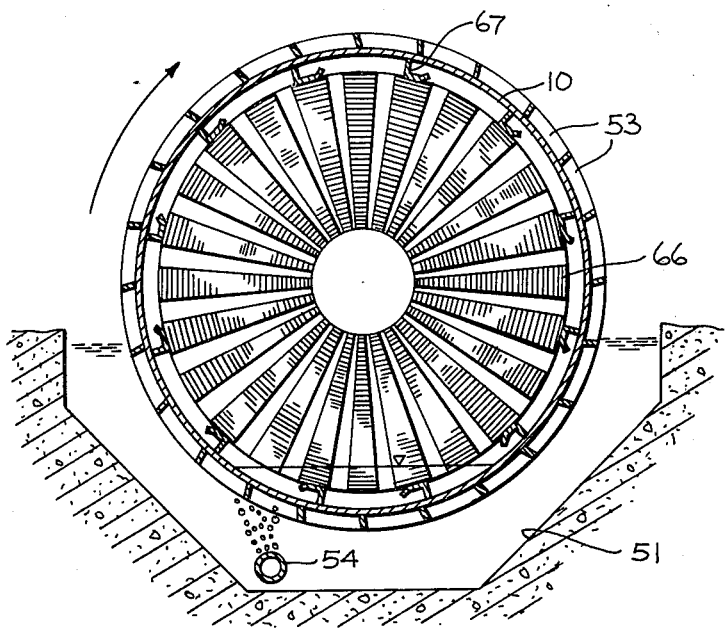
FIG. 6 is a view in vertical cross section taken in the plane of line 6—6 of FIG. 4.
Figure 7:
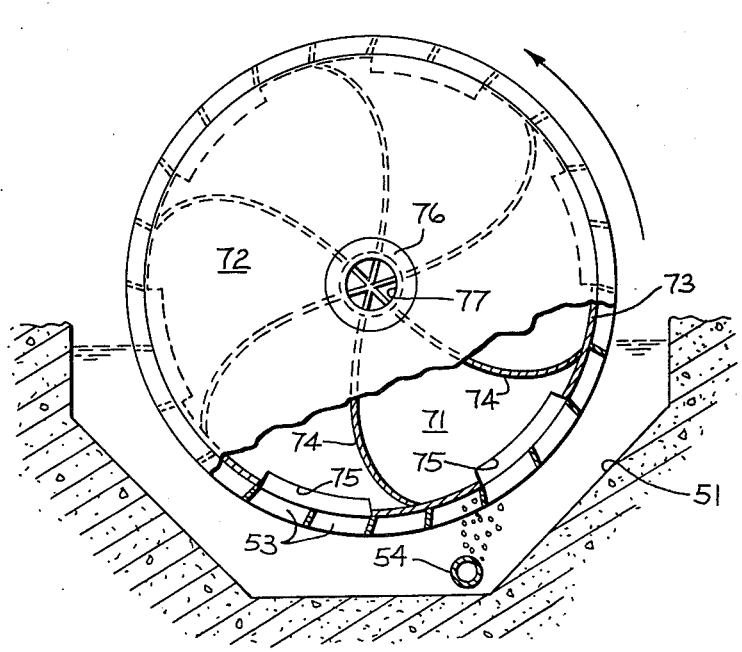
FIG. 7 is a view in elevation of the output end of the rotating trickling filter of FIG. 4 with portions again broken away for purposes of illustration.

The inlet assembly 56 would be sized to provide a continuous volume of wastewater to the interior of the shell 52 to maintain only a shallow pool of wastewater within the shell 52 (see FIG. 6). The outlet assembly 70 would also be sized to withdraw a continuous volume of treated water from the shell 52 sufficient to maintain the shallow pool within the shell 52.

The operation of the unit is similar to that described for the first embodiment except that the wastewater being treated will have been first subjected to the aerating effects of the air or other oxygen-containing gas being discharged in the holding tank 51. Accordingly, the wastewater will have a somewhat higher dissolved oxygen than would normal wastewater.

The treatment efficiency can be enhanced by providing an oxygen enriched environment within the interior of the shell 52 and this can be accomplished by feeding oxygen under pressure through a tube 81 which leads into the interior of the shell 52 at the inlet end.

The filter unit 50 may also be formed of lightweight synthetic materials such as polyethylene and fiberglass so that, assisted by the air or oxygen enriched atmosphere within the shell 52, the unit 50 will be buoyant and will float in the wastewater in the holding tank 51. Alternatively, the unit 50 may be supported at each end on stub shafts disposed at its axis of rotation.

In both of the embodiments illustrated, the lifting means is in the form of separate, longitudinally extending troughs or channels. Alternatively, the lifting means may be provided by scoops joined to or formed integrally with the contact media. In the case of flat discs, as in the first embodiment, the scoops may be formed to bridge opposing interior surfaces of adjacent discs or may be formed as projections on the surfaces of the discs adjacent the periphery of the discs. In the case of the contact media built up from formed sheets, as in the second embodiment, the scoops may be formed integrally with the formed sheets at points adjacent the periphery of the media. If scoops are employed which are disposed within the envelope defined by the outer periphery of the contact media, the media can extend radially outwardly to rest against and be supported by the entire interior surface of the shell. Transverse openings would then be provided in the contact media with the openings arranged generally parallel to the axis of rotation so that wastewater can pass from the inlet end to the outlet end of the shell. Alternatively, the scoops can be formed as projections from the periphery of the media with a gap provided between the media and shell for wastewater passage.

The rotating trickling filter in accordance with this invention has advantages over both stationary trickling filters and over rotating biological contactors. With respect to biological contactors, the rotating trickling filter is a more efficient user of energy. Normal rotating biological contactor energy requirements vary approximately with the square of the speed of rotation because of the hydraulic drag which is present. The energy requirements for the rotating trickling filter will vary approximately linearly with speed. As a result, it is possible to operate the rotating trickling filter at a higher rate of speed to get greater exposure of the surfaces to wastewater and dissolved oxygen without prohibitively increasing the energy requirements. Also, as previously noted, the rotating trickling filter contact media is subject to lower stresses than the normal rotating contactor.

As compared with a stationary trickling filter, a higher degree of treatment is possible because the rotating trickling filter will function as a multiple pass trickling filter where each drop of wastewater will be exposed to several different surfaces. The normal static trickling filter provides only a single pass treatment. If multiple opportunities for contact are provided in static trickling filters, it is necessary to recirculate the wastewater from the bottom of the filter up to the top. While such a process is known, a greater amount of energy is required to pump the water over the very high head required between the bottom and top of a trickling filter stack. Furthermore, the use of lifting means in the form of open channels provides an almost perfectly efficient pumping arrangement in the rotating trickling filter whereas the pumps required to provide multiple passes in static trickling filters have the usual inefficiencies of pumps.

The multiple opportunities for contact provided by the rotating trickling filter eliminates the possibilities of short-circuiting which does occur in stationary trickling filters. Stationary trickling filters are also susceptible to plugging by the biological slimes whereas the rotating trickling filter will insure the sloughing of slimes by the agitation and movement provided to the wastewater.

I claim:

1. A rotating trickling filter comprising:
   a hollow, elongated, imperforate, circular cylindrical shell;
   a wastewater inlet at one end of said shell;
   a treated water outlet at the opposite end of said shell;
   means for rotating said shell;
   longitudinally extending wastewater lifting means disposed adjacent the inner surface of said shell;
   fixed film contactor media mounted within said shell between the inlet and outlet means; and
   means for maintaining a low level of wastewater in said shell so that a shallow pool of wastewater is formed at the bottom of said shell and through which said lifting means sweeps to pick up and subsequently discharge wastewater over said media as the shell is rotated.

2. A rotating trickling filter in accordance with claim 1 wherein a plurality of interior bulkheads divide the shell into a series of connected chambers with each bulkhead including a weir which controls the level of wastewater in the prior compartment, and each weir from the inlet to the outlet maintaining the wastewater in a subsequent chamber at a lower level than in a prior chamber.

3. A rotating trickling filter in accordance with claim 1 wherein said shell is cradled on spaced belts which are engaged about rollers, and said rotating means comprises a motor connected to drive one of said rollers.

4. A rotating trickling filter in accordance with claim 1 wherein said lifting means comprises a plurality of spaced channels which scoop wastewater from the pool of wastewater in said shell, raise the wastewater as the channels ascend, and discharge the wastewater over the media in a trajectory which adds the weight of the wastewater to the descending media surfaces.

5. A rotating trickling filter in accordance with claim 1 wherein said wastewater level maintaining means comprises a plate having a central opening whose edge defines a weir, said plate being disposed adjacent said outlet.

6. A rotating trickling filter comprising:

a hollow, elongated, imperforate, circular cylindrical shell;

a wastewater inlet at one end of said shell;

a treated water outlet at the opposite end of said shell;

driving means for rotating said shell;

fixed film contactor media mounted wtihin said shell between the inlet and outlet and adapted to rotate with said shell;

longitudinally extending wastewater lifting means disposed adjacent the inner surface of said shell;

said media is centered within and spaced from the interior surface of the shell; said longitudinally extending lifting means are disposed in the space between the media and the shell and adapted upon rotation of the shell to carry water from a pool of water in the bottom of the shell over the media as the shell rotates; and input means for introducing a controlled quantity of wastewater through said inlet so that the wastewater within said shell occupies only a small portion of the volume of said shell.

7. A rotating trickling filter in accordance with claim 6 together with means for introducing oxygen to the interior of said shell.

8. A rotating trickling filter comprising:

a hollow, elongated, imperforate, circular cylindrical shell;

a wastewater inlet at one end of said shell;

a treated water outlet at the opposite end of said shell;

driving means for rotating said shell;

fixed film contactor media mounted within said shell between the inlet and outlet and adapted to rotate with said shell, said media being centered within and spaced from the interior surface of the shell;

longitudinally extending lifting means disposed in the space between the media and the shell and adapted upon rotation of the shell to carry water from a pool of water in the bottom of the shell over the media;

input means for introducing a controlled quantity of wastewater through said inlet so that the wastewater within said shell occupies only a small portion of the volume of said shell; and said shell being disposed in a wastewater holding tank and said input means draws wastewater from said holding tank.

9. A rotating trickling filter in accordance with claim 8 wherein said driving means comprises a gas conduit disposed within said holding tank and having discharge openings beneath said shell, a plurality of shallow cups disposed about the outer periphery of said shell and adapted to trap gas discharged from said openings, and means for supplying a gas under pressure to said conduit.

* * * * *